(12) United States Patent
Stehlig et al.

(10) Patent No.: US 10,927,955 B2
(45) Date of Patent: Feb. 23, 2021

(54) SEALING ELEMENT

(71) Applicant: Mahle International GmbH, Stuttgart (DE)

(72) Inventors: Juergen Stehlig, Neckartenzlingen (DE); Pierre-Yves Guiton, Aichwald (DE)

(73) Assignee: Mahle International GmbH

(*) Notice: Subject to any disclaimer, the term of this patent is extended or adjusted under 35 U.S.C. 154(b) by 0 days.

(21) Appl. No.: 16/320,937

(22) PCT Filed: Jul. 21, 2017

(86) PCT No.: PCT/EP2017/068496
§ 371 (c)(1),
(2) Date: Jan. 25, 2019

(87) PCT Pub. No.: WO2018/019722
PCT Pub. Date: Feb. 1, 2018

(65) Prior Publication Data
US 2019/0162308 A1   May 30, 2019

(30) Foreign Application Priority Data

Jul. 28, 2016  (DE) .......... 10 2016 213 899

(51) Int. Cl.
*F16J 15/10*   (2006.01)
(52) U.S. Cl.
CPC .................. *F16J 15/104* (2013.01)
(58) Field of Classification Search
CPC ............. F16J 15/104; F16J 15/06; F16J 15/10
See application file for complete search history.

(56) References Cited

U.S. PATENT DOCUMENTS

| 3,584,889 A | * | 6/1971 | Sheets | F16J 15/022 |
| | | | | 277/626 |
| 4,432,415 A | * | 2/1984 | Wright | F28F 3/10 |
| | | | | 165/166 |
| 5,536,018 A | * | 7/1996 | Szott | F16J 15/104 |
| | | | | 277/313 |

(Continued)

FOREIGN PATENT DOCUMENTS

| DE | 20 2011 108 989 U1 | 3/2013 |
| DE | 20 2011 108 992 U1 | 3/2013 |

(Continued)

OTHER PUBLICATIONS

English abstract for DE-20 2011 108 992.

(Continued)

*Primary Examiner* — Eugene G Byrd
(74) *Attorney, Agent, or Firm* — Fishman Stewart PLLC

(57) ABSTRACT

A sealing element of a motor vehicle may include a body, at least one first region, and at least one second region. The at least one first region may be composed of a first material. The at least one second region may be composed of a second material having a higher chemical resistance than the first material. A distribution of the at least one first region and a distribution of the at least one second region in a cross-sectional profile of the body may be variable in a longitudinal direction extending perpendicular to the cross-sectional profile of the body.

17 Claims, 4 Drawing Sheets

(56) References Cited

U.S. PATENT DOCUMENTS

| | | | |
|---|---|---|---|
| 6,277,315 B1* | 8/2001 | H.ang.llstedt | F16J 15/104 264/250 |
| 6,663,112 B1* | 12/2003 | Sporre | F16L 21/03 277/584 |
| 6,730,385 B1* | 5/2004 | Tanaka | B32B 25/04 428/66.4 |
| 8,141,531 B2* | 3/2012 | Smith | F02F 7/006 123/90.38 |
| 9,494,236 B2* | 11/2016 | Cook | F16J 15/102 |
| 10,393,064 B2* | 8/2019 | Ito | F02F 7/0043 |
| 2004/0239047 A1* | 12/2004 | Kent | F16J 15/064 277/628 |
| 2005/0067791 A1* | 3/2005 | Bock | F16J 15/104 277/500 |
| 2007/0045967 A1 | 3/2007 | Park | |
| 2008/0018058 A1* | 1/2008 | Kobayashi | F16J 15/062 277/650 |
| 2008/0197578 A1 | 8/2008 | Osborne | |
| 2009/0008879 A1* | 1/2009 | Hornig | C08L 33/08 277/316 |
| 2009/0109607 A1* | 4/2009 | Rupp | F16J 15/102 361/679.01 |
| 2010/0044970 A1* | 2/2010 | Suzuki | F16J 15/061 277/592 |
| 2011/0210521 A1 | 9/2011 | Warren et al. | |
| 2011/0227295 A1 | 9/2011 | Watanabe et al. | |
| 2015/0152990 A1* | 6/2015 | Lopez-Chaves | F16L 21/03 277/609 |
| 2017/0030466 A1* | 2/2017 | Fonville | F16J 15/022 |
| 2017/0211703 A1* | 7/2017 | Hatano | F16J 15/102 |

FOREIGN PATENT DOCUMENTS

| | | | |
|---|---|---|---|
| DE | 102012205002 A1 | | 10/2013 |
| FR | 2863677 A1 | | 6/2005 |
| JP | H11-2328 A | | 1/1999 |
| JP | 2007024210 A | * | 2/2007 |
| JP | 2007255671 A | * | 10/2007 |
| WO | 2015069829 A1 | | 5/2015 |

OTHER PUBLICATIONS

English abstract for DE-20 2011 108 989.
English abstract for JP-H11-2328.
English abstract for DE-102012205002.
English Abstract for FR2863667A1.
Chinese Office Action dated Jan. 21, 2020 for copending Chinese Patent Application No. 201780045425.6 (with English translation).

* cited by examiner

SEALING ELEMENT

CROSS-REFERENCE TO RELATED APPLICATIONS

This application claims priority to International Patent Application No. PCT/EP2017/068496, filed Jul. 21, 2017, and German Patent Application No. DE 10 2016 213 899.5, filed on Jul. 28, 2016, the contents of both of which are hereby incorporated by reference in their entirety.

TECHNICAL FIELD

The present invention relates to a sealing element for sealing vehicle components of a motor vehicle.

BACKGROUND

In the sealing of vehicle components, which have at least two vehicle component parts, for example a housing and a cover, as is known sealing elements, often produced from polymer materials, are used. Polymers, like all organic chemical materials, are not able to be used unrestrictedly as a consequence of environmental influences, through contact with different media, oxygen or ozone and also pressure or temperature. Through such environmental influences, the material properties of the polymers change and therefore have a direct influence on the sealing behaviour of the sealing elements. In particular with the use of such sealing elements in vehicle components of motor vehicles, a high chemical resistance of the polymers with respect to oils, fuels and acids, and in addition a good temperature resistance, is necessary.

Sealing elements which are manufactured from polymeric materials are generally known from the prior art.

DE 20 2011 108 992 U1 discloses a sealing element which is produced from a fluorine-containing polymer, in particular from a filled or unfilled polytetrafluoroethylene (PTFE). The sealing element is configured here as a closed ring seal. In addition, the sealing element has two radially adjacent zones, running in circumferential direction, in which a sealing material has a different density, so that the sealing material has a non-constant density profile in a cross-section substantially perpendicularly to the circumferential direction. The at least two zones running in circumferential direction adjoin one another here respectively radially and extend in particular over the entire axial thickness of the sealing element.

DE 20 2011 108 989 U1 likewise discloses a sealing element configured as a closed ring seal, which is produced from a fluorine-containing polymer, in particular from a filled or an unfilled polytetrafluoroethylene (PTFE). A sealing material of the sealing element has here a non-constant density development with respect to a cross-section substantially perpendicularly to a circumferential direction of the sealing element. The density profile development of the sealing element is to be described as a flowing transition between an inner region and an outer region of the ring seal.

SUMMARY

The present invention is based on the problem of providing an improved or at least different embodiment of a sealing element for sealing vehicle components, which is distinguished in particular by an advantageous configuration of the sealing element and, in addition, is to be manufactured at a favourable cost.

This problem is solved according to the invention by the subject of the independent claim(s). Advantageous embodiments are the subject of the dependent claim(s).

The invention is based on the general idea that a sealing element has at least one first region, which consists entirely and exclusively of a first material, and at least one second region, which consists entirely and exclusively of a second material, wherein the second material has a higher chemical resistance than the first material. Such a configuration represents a demand-driven arrangement of materials having different material properties in different regions in a sealing element. Preferably, the sealing element consists exclusively of the first material and of the second material and particularly preferably the materials are exclusively polymer materials. The essence of the invention is that only the regions, hereinbelow designated second region, in a sealing element have the second material, which in the intended use of the sealing element are in direct contact with chemically aggressive media. The regions, hereinbelow designated first region, in a sealing element, in which in the predetermined use no direct contact with chemically aggressive media exists, are formed from a more favourably priced first material, which has a lower resistance with respect to chemically aggressive media. In particular in the case of vehicle components, a chemical resistance with respect to media such as oils, fuels or acids is necessary, which, however, are mostly only in contact with a small area of the sealing element. It is clear that the less aggressive media, such as e.g. lubricating oil, can mix with more aggressive media, such as e.g. fuel, during operation, and thereby become more aggressive. A configuration of the sealing element with at least two regions is therefore expedient, wherein in the predetermined use of the sealing element exclusively the second region is in contact with the previously described aggressive or respectively more aggressive media.

In an advantageous embodiment, the first region and the second region directly adjoin one another or respectively are directly connected with one another and form, together, the sealing element as such.

In an advantageous embodiment, the second material in the second region is selected in particular from the group fluorosilicone rubber (FVMQ), fluororubber (FKM) and hydrogenated acrylonitrile butadiene rubber (HNBR). The first material in the first region is selected in particular from the group ethylene acrylate rubber (AEM), polyacrylate rubber (ACM), methyl-vinyl silicone rubber (MVQ), acrylonitrile butadiene rubber (NBR) and ethylene propylene diene rubber (EPDM).

It is to be stated that both for the first material in the first region and also for the second material in the second region the use of identical base polymers is conceivable, wherein it is essential to the invention that the base polymer of the second material in the second region is refined by the addition of additives and therefore forms the chemically more resistant second material in contrast to the first material.

In a further advantageous embodiment, the sealing element is formed as a ring seal which is closed in circumferential direction. An inner contour of the sealing element, facing an inner region surrounded by the sealing element which is configured as a ring seal, is formed, in a first case, by the first region, and in a second case by the second region. An outer contour of the sealing element, facing away from the inner region, is formed in the first case by the second region, and in the second case by the first region. In particular in the case of the sealing of vehicle components, it is usual that sealing elements are exposed to a chemically aggressive medium either in the inner region or in the outer region. For example, in the case of an oil sump for collecting oils, the chemically aggressive side is present at the inner contour of the sealing element. According to the invention, the inner contour of the sealing element has, in this case, the second region with the chemically more resistant second material, whereas the outer contour is formed from the first region with the less chemically resistant first material.

The longitudinal direction of the sealing element extends, with a closed construction of the sealing element, in the circumferential direction, and with a non-closed or open construction of the sealing element, extends from the one end to the other end of the sealing element.

In an advantageous embodiment variant, the sealing element has the first region and the second region in a cross-sectional profile running perpendicularly to the longitudinal direction, at each location in longitudinal direction of the sealing element.

In another embodiment variant, the sealing element has at least one longitudinal portion, which is formed exclusively from the first material of the first region or from the second material of the second region. Preferably, on vehicle components which have blow-by sites, the sealing element has a longitudinal portion which is formed exclusively from the second material of the second region. Blow-by sites are sites in vehicle components at which, on a compression, gases brush past which stress a sealing element particularly intensively in this region. Expediently, sites on vehicle components which are less, or respectively not at all, stressed, are preferably formed by longitudinal portions of the sealing element from the first region with the first material.

Advantageously, the first and the second region in the cross-sectional profile of the sealing element are formed at least partially mirror-symmetrically in longitudinal direction. This means that the first region and the second region are directly in contact, are arranged to identical parts in the sealing element and they form the entire cross-sectional profile of the sealing element.

In an advantageous embodiment variant, the distribution of the first region and of the second region in the cross-sectional profile of the sealing element runs in a constant manner in longitudinal direction. The constant distribution constitutes a simple production process from a manufacturing point of view.

In a further advantageous embodiment variant, the distribution of the first region and of the second region in the cross-sectional profile of the sealing element runs in a variable manner in longitudinal direction. This embodiment variant can come into use in particular preferably in the case of sealing elements which are exposed to locally irregular stresses.

In an advantageous embodiment of the idea according to the invention, the sealing element has sealing contours, for example in the form of sealing lips, bead-like thickenings or noses. The sealing contours form a component of the cross-sectional profile of the sealing element which is constant in longitudinal direction. Expediently, the sealing contours project in the direction of the vehicle component parts which are to be sealed. Preferably, the sealing element has a rectangular cross-section, provided with radii, which has at least one nose arranged orthogonally in the direction of a component which is to be sealed, which nose extends into a recess or respectively groove, formed in a complementary manner for this, on a vehicle component part which is to be sealed. On this nose in particular preferably two shell walls, respectively lying opposite in direction, of the recess or respectively groove of the vehicle component parts which are to be sealed, bead-like thickenings can project, which are to be designated as sealing contours and ensure a sealing. Expediently, the sealing element on a side facing away from the nose, therefore facing the other vehicle component part which is to be sealed, can preferably have two sealing lips in the region of the nose. The sealing lips can also extend into recesses or respectively grooves, provided in a complementary manner for this, of a second vehicle component part which is to be sealed.

In so far as at least two sealing contours are provided, which are to come to lie in a sealing manner against the same vehicle component, they are expediently arranged so that they act in series.

In an embodiment variant, in which the sealing element is configured as a ring seal, inner contours serve for the sealing of the inner region, and outer sealing contours serve for the sealing of an outer region. Preferably, a boundary runs between the first region and the second region in the cross-sectional profile of the sealing element, in particular between the sealing contours for sealing the inner region and the sealing contours for sealing the outer region. With such an arrangement of the regions, it can be ensured that for example a chemically aggressive medium situated in the interior of a vehicle component is sealed exclusively by one of the regions of the sealing element and therefore also only comes in contact with one, expediently the second, material. This means that respectively a bead-like thickening for the sealing of a first vehicle component part and a sealing lip for the sealing of a second vehicle component part, expediently respectively in the direction of the inner region and of the outer region, are formed from one of the regions and therefore from the same material.

The second region with the media-resistant second material can be injected into a tool locally onto the surfaces at which the sealing element is in contact with a chemically aggressive medium. The tool can be partially opened, in order to free the volume for the first region with the first material. The first material can also be injected into the tool. The connection of the first material with the second material can be achieved by the chemical-technical method of vulcanization without additives. Likewise, the addition of additional chemical components, such as for example vulcanization accelerators, represents a possible production method of the sealing element.

Another embodiment makes provision that at least one such second region is formed by a film which is arranged externally on the first region. Hereby, a composite seal, as it were, of two separately produced elements can be produced. Alternatively, the material of the first region can be injected onto the previously produced film forming the second region. Such a film can be produced basically from metal or respectively from a metal alloy. Likewise, the film can be glued, welded or vulcanized onto the first material of the first region.

A further embodiment makes provision that at least one such second region is formed by a coating which is applied externally onto the first region. Hereby, only one surface portion of the first material is provided with the second material. Therefore, only very little of the expensive second material is required, in order to form the second region, whereby the sealing element can be produced comparatively inexpensively. The coating can be injected on or applied by means of electroplating on the first region.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
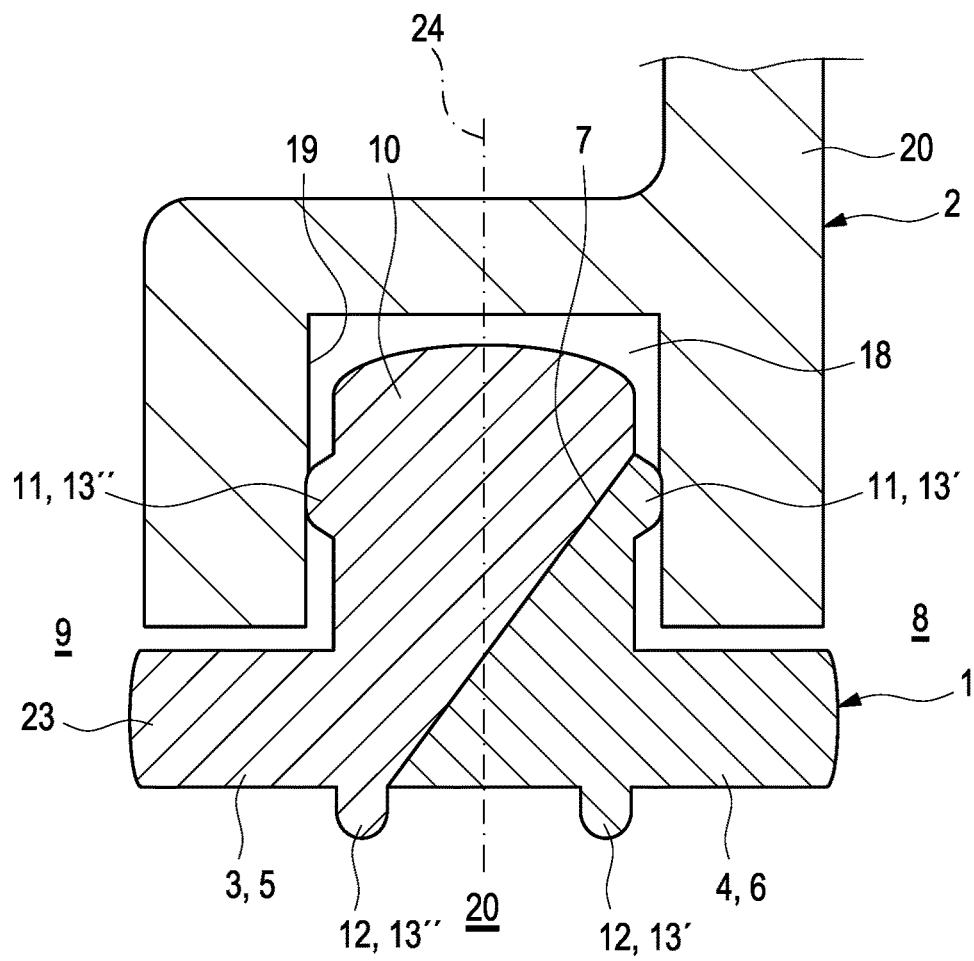
FIG. 1 shows a cross-sectional profile of a sealing element for sealing a vehicle component having a first region and a second region.

FIG. 1 shows diagrammatically a cross-sectional profile of a sealing element 1, which has a first region 3 and a second region 4. The sealing element 1 is arranged in a vehicle component 2 and seals an inner region 8, lying within the vehicle component 2, from an outer region 9 lying outside the vehicle component 2. The vehicle component 2 which is to be sealed generally has at least two vehicle component parts 20, wherein in fact in this figure only one vehicle component part 20 is illustrated in the upper region. The first region 3 of the sealing element 1 is formed from a first material 5, and the second region 4 is formed from a second material 6. The first region 3 and the second region 4 are connected directly to one another and have at their contact faces a boundary 7. Together, the first region 3 and the second region 4 form the sealing element 1. The second material 6 in the second region 4 has a higher chemical resistance than the first material 5 in the first region 3.

The sealing element 1 has a rectangular base body 23 in the cross-sectional profile, on which a nose 10 is arranged projecting orthogonally in the direction of the vehicle component part 20. The nose 20 extends into a recess or respectively groove 18 configured in a manner complementary thereto on the vehicle component part 20. For the fluidic sealing, sealing contours 13 are arranged on the sealing element 1, which contours project in the direction of the vehicle component part 20 which is to be sealed. Respectively laterally on the nose 10 bead-like thickenings 11, as sealing contours 13, project in the direction of a side wall 19 of the recess or respectively groove 18 of the vehicle component part 20, and form a fluidic seal between the sealing element 1 and the vehicle component part 20. On a side facing away from the nose 10, two sealing lips 12, remote from one another, project in the direction of a second vehicle component part 20 which is to be sealed. Purely by way of example, these sealing lips 12 may lie approximately vertically beneath the bead-like thickenings 11.

Figure 2:
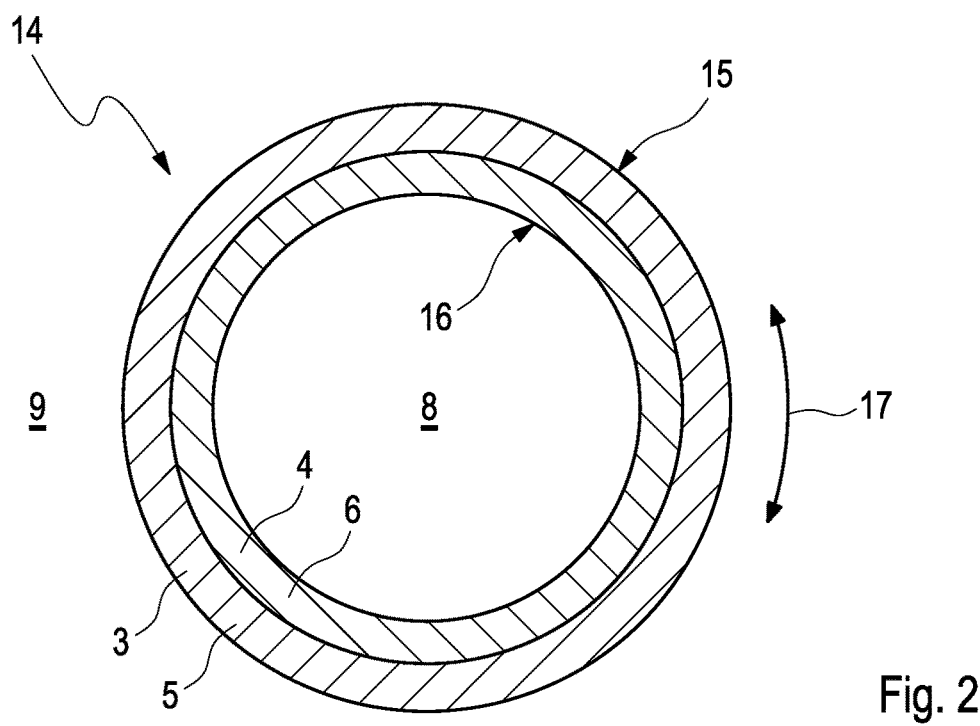
FIG. 2 shows a top view of a sealing element configured as a ring seal having a first and a second region.

FIG. 2 shows a top view of the sealing element 1 as a ring seal 14 which is closed in circumferential direction 17. The ring seal 14 has an inner contour 18, which surrounds the inner region 8. The inner contour 18 is formed from the second region 4 with the second material 6. An outer contour 15 of the ring seal 14 is formed from the first region 3 with the first material 5. The outer contour 15 faces the outer region 9. In the embodiment variant of the sealing element 1 as ring seal 14, the sealing element 1 therefore separates the outer region 9 from the inner region 8. Depending on which region, therefore the inner region 8 or the outer region 9, has a chemically aggressive medium, the second region 4 which has the chemically resistant second material 6 can form either the inner contour 16 or the outer contour 15. In the further embodiment variants, directed to a distribution of the individual regions 3, 4, inter alia also alternatives are indicated, in which in longitudinal portions 21 both an inner region 8 and also an outer region 9, have a chemically aggressive medium, so that the sealing element 1 in these longitudinal portions 21 is formed both on the inner region 8 and also in the outer region 9 by the second region 4 therefore the second material 6.

The sealing element 1 can preferably have in the cross-sectional profile at each site in circumferential direction 17 of the ring seal 14 the first region 3 with the first material 5 and the second region 4 with the second material 6.

The distribution of the first region 3 with the first material 5 and of the second region 4 with the second material 6 in the cross-sectional profile of the sealing element 1 as ring seal 14 can run constantly in circumferential direction 17 or else variably in circumferential direction 17. This means that with a variable course at sites which are stressed more or stressed less, the distribution of the individual regions 3, 4 can vary. At chemically intensively stressed sites, the second region 4 with the second material 6 can be formed more markedly than the first region 3 with the first material 5. In the case of less intensively stressed sites, to that effect the first region 3 with the first material 5 can be more intensively marked than the second region 4 with the second material 6. The same applies in the embodiment as a non-closed sealing element 1, wherein the first region 3 and the second region 4 can likewise run constantly or variably in longitudinal direction of the sealing element 1.

Figure 3:
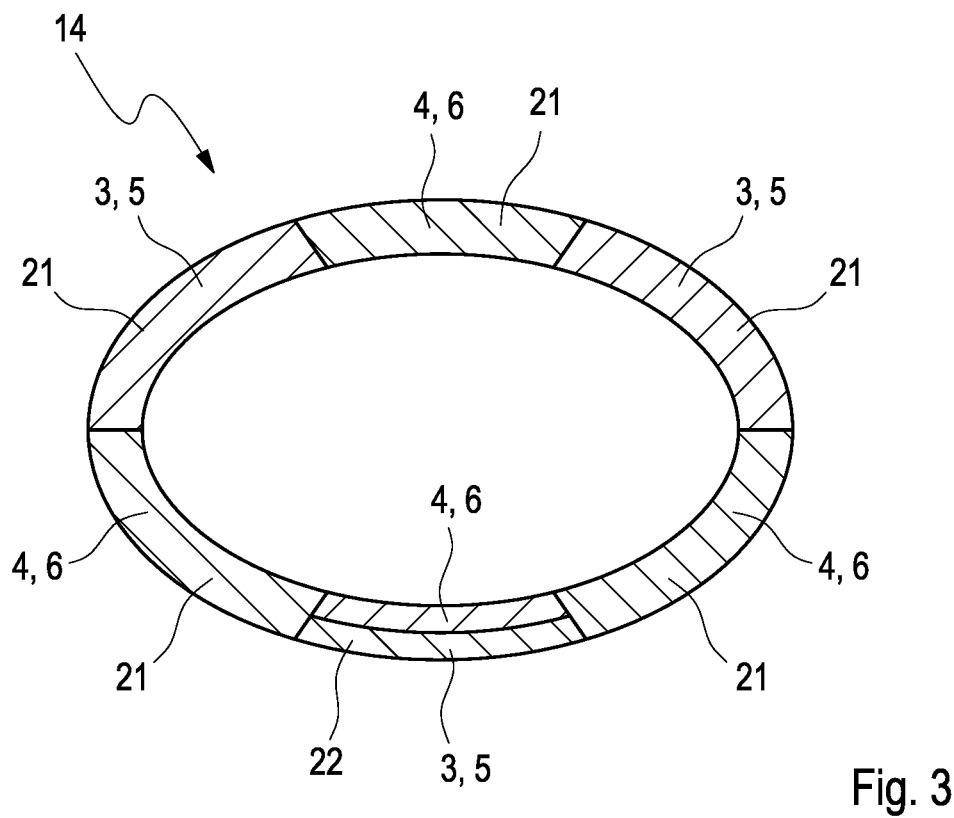
FIG. 3 shows a highly simplified illustration of a ring seal with longitudinal portions, which only have one region, FIGS. 4 through 8 respectively shows a cross-sectional profile of sealing elements with different distributions of the first region and of the second region, FIGS. 9 and 10 respectively show a cross-sectional profile of sealing elements of other embodiments.

FIG. 3 shows a highly simplified illustration of a sealing element 1 formed as a ring seal 14, which has longitudinal portions 21, which are formed respectively exclusively from the first region 3 with the first material 5 or from the second region 4 with the second material 6. A further longitudinal portion 22 has both the first region 3 with the first material 5 and the second region 4 with the second material 6. The longitudinal portion 22 is to clarify that the longitudinal portions 21, 22 may have only one region and also both regions 3, 4.

FIG. 4 to FIG. 8 show respectively different cross-sectional profiles of the sealing element 1 with different distributions of the first region 3 and of the second region 4.

Figure 4:
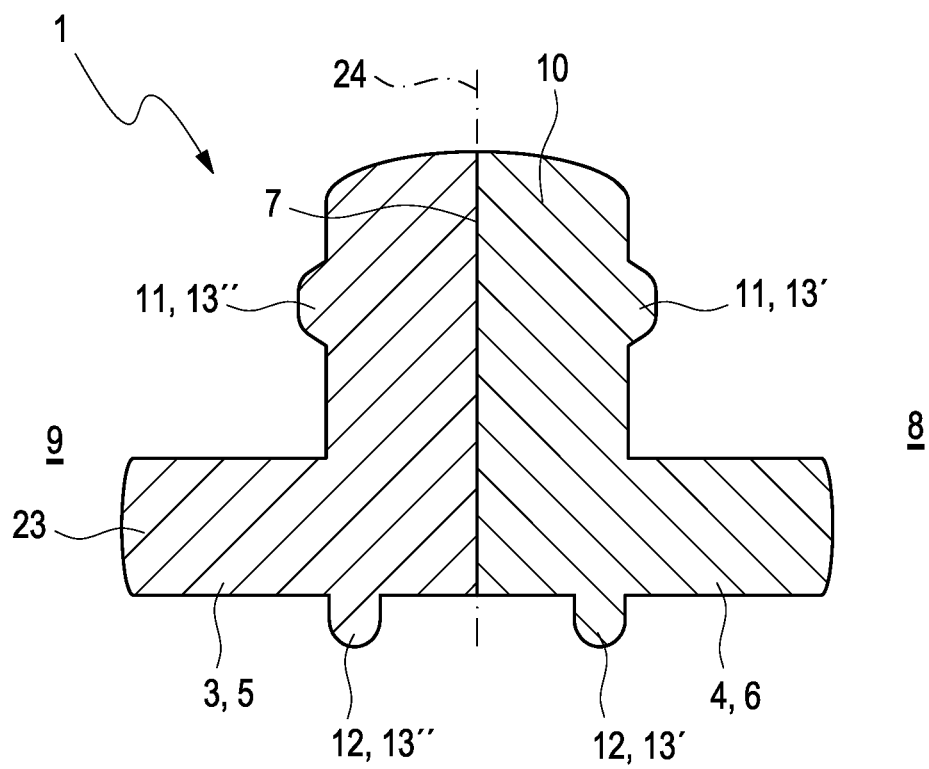

FIG. 4 shows a possible distribution, in which the first region 3 is formed mirror-symmetrically to the second region 4. The boundary 7 runs through a centre axis 24 in longitudinal direction, whereby an equal distribution of the first region 3 and of the second region 4 occurs. With this distribution of the regions, the first region 3 and the second region 4 have as sealing contours 13 respectively a sealing lip 12 and a bead-like thickening 11.

Figure 5:
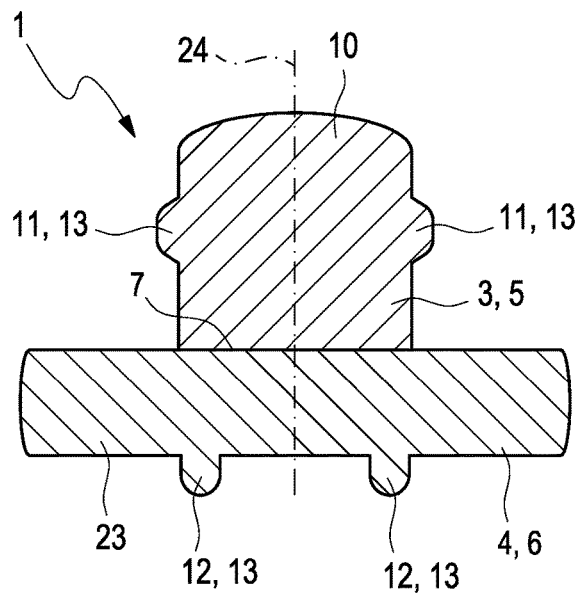

In FIG. 5 a cross-sectional profile of another sealing element 1 is illustrated, wherein the base body 23 of the sealing element 1 and the sealing lips are formed from the second region 4 with the second material 6, and the nose 10 formed orthogonally on the base body 23 and the bead-like thickenings 11 are formed from the first region 3 with the first material 5. The boundary 7, which describes a separation of the regions 3, 4, therefore runs between the base body 23 and the nose 10.

Figure 6:
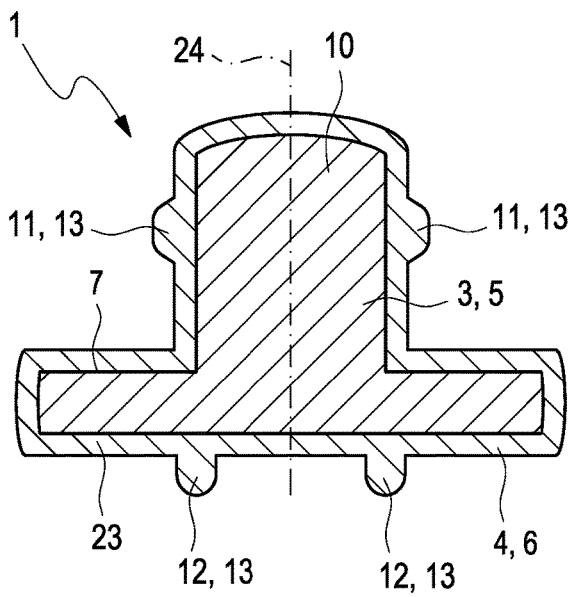

FIG. 6 shows a cross-sectional profile of a sealing element 1, which has in the interior the first region 3 with the first material 5, and is completely surrounded from the exterior by the second region 4 with the second material 6. The sealing contours 13, therefore both the bead-like thickenings 11 and also the sealing lips 12 are likewise formed from the second material 6.

Figure 7:
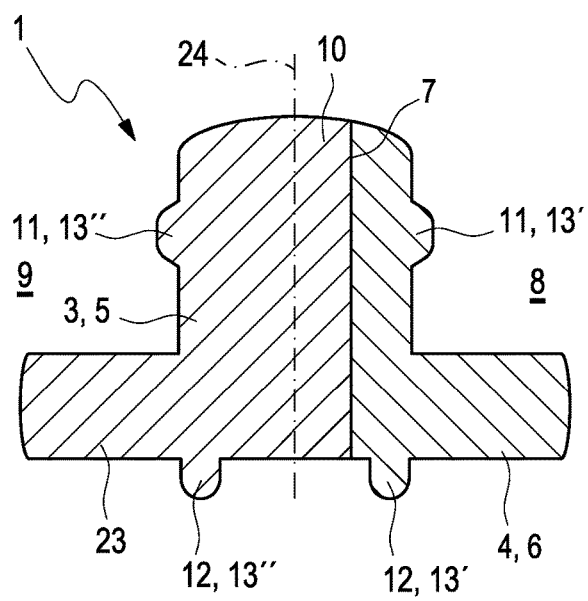

FIG. 7 shows a boundary 7, displaced parallel to the centre axis 24 to one side, between the first region 3 and the second region 4, wherein the second region 4 comprises entirely on one side a bead-like thickening 11 and a sealing lip 12.

Figure 8:
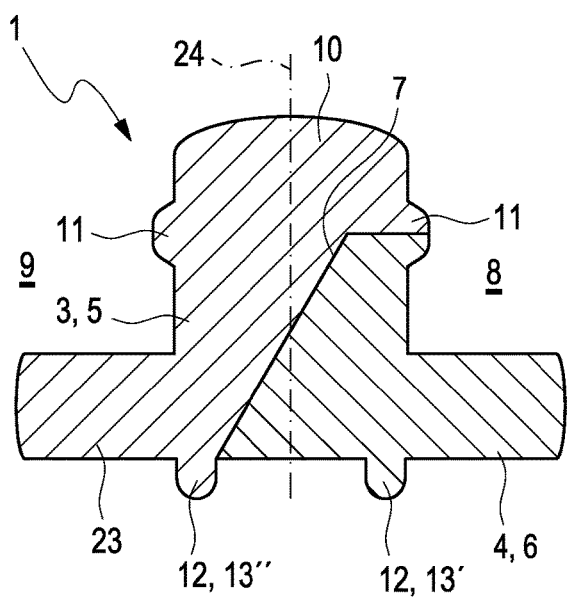

FIG. 8 shows a preferred embodiment of a distribution of the first region 3 and of the second region 4, wherein the second region 4 forms on one side the bead-like thickening 11, and extends at least partly in the direction of the sealing element 1 and runs out in an incline to the start of the opposite sealing lip 12, which is inclined with respect to the centre axis 24.

In so far as the sealing element 1 is configured as a closed ring seal 14, it surrounds the inner region 8 and separates or respectively seals the latter from the outer region 9. In so far as at least two sealing contours 13 act in series, in order to seal the inner region 8 with respect to the outer region 9, the sealing contour 13, exposed to the inner region 8 or respectively sealing the inner region 8, can be designated as inner sealing contour 13', whereas the sealing contour 13 exposed to the outer region 9 or respectively sealing the outer region 9 can be designated as outer sealing contour 13".

FIGS. 4, 7 and 8 therefore show in particular respectively an embodiment of the sealing element 1 in which the sealing element 1 is a ring seal 14 closed in circumferential direction 17, which surrounds the inner region 8, wherein the sealing element 1 has at least one inner sealing contour 13' and at least one outer sealing contour 13", e.g. in the form of sealing lips 12 or bead-like thickenings 11, which project in the direction of vehicle component parts 20 which are to be sealed, wherein the respective inner sealing contour 13' is configured for sealing the inner region 8, whereas the respective outer sealing contour 13" is configured for sealing the outer region 9 facing the outer contour 15, wherein the boundary 7 between the first region 3 and the second region 4 in the cross-sectional profile of the sealing element 1 runs between the inner sealing contour 13' and the outer sealing contour 13".

Figure 9:
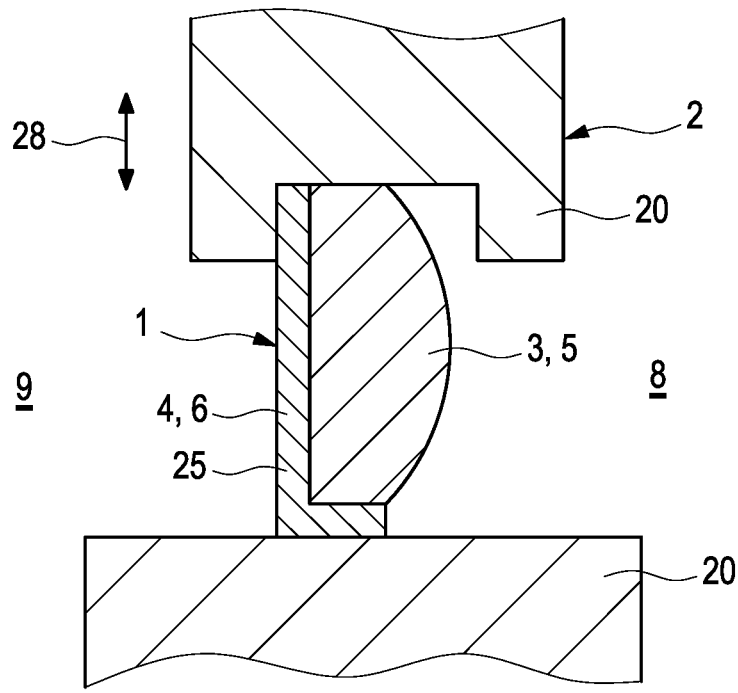

In FIG. 9 an embodiment is shown, in which the second region 4 is formed by a film 25, which is arranged externally on the first region 3. The film 25 is arranged here so that it produces an axial contact with the one, in FIG. 9 lower, vehicle component 20. In this case, the first region 3 has no contact with this lower vehicle component 20. In contrast thereto, the first region 3 is in axial contact in a sealing manner with the other, in FIG. 9 upper, vehicle component 20. The film 25 can lie optionally transversely to the axial direction, in particular radially, on the other or respectively upper vehicle component 20. The axial direction is symbolized in FIG. 9 by an arrow 28 and corresponds here to the direction in which the vehicle components 20 rest against one another via the sealing element 1, in order to seal the inner region 8 from the outer region 9 transversely thereto.

Figure 10:
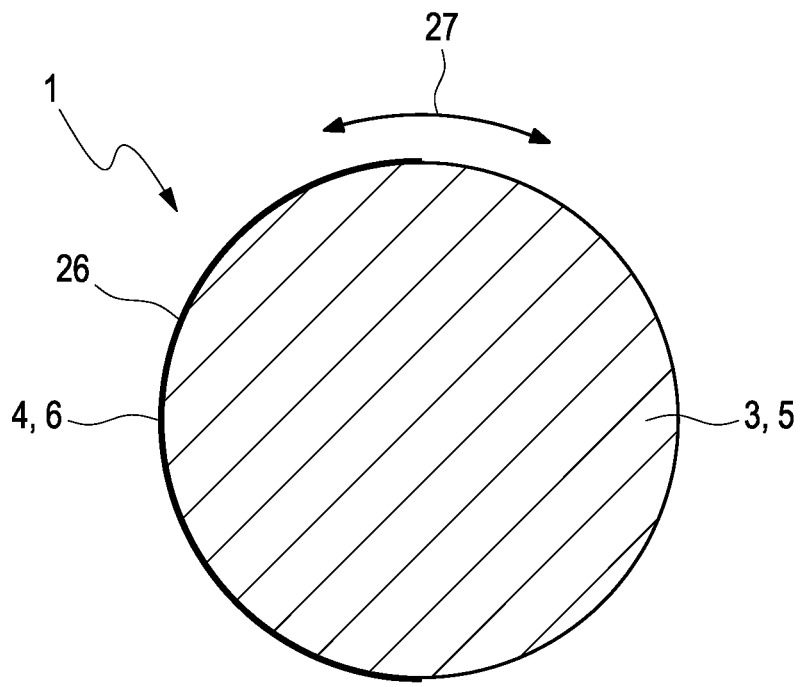

FIG. 10 shows a further embodiment, in which the second region 4 is formed by a coating 26, which is applied externally onto the first region 3. In the example of FIG. 10, the coating 26 extends in the profile circumferential direction 27 over more than 25% or respectively 90°, preferably approximately over 50% or respectively 180° of the total circumference of the cross-sectional profile of the sealing element 1.

The invention claimed is:

1. A sealing element of a motor vehicle, comprising a ring body extending in a circumferential direction, the ring body including at least one first region and at least one second region, the at least one first region composed of a first material and the at least one second region composed of a second material having a higher chemical resistance than the first material, wherein:
   a distribution of the at least one first region and a distribution of the at least one second region in a cross-sectional profile of the ring body perpendicular to the circumferential direction is variable in the circumferential direction;
   the ring body has a permanently closed construction in the circumferential direction;
   the ring body includes a plurality of circumferential sections;
   the distribution of the at least one first region and the distribution of the at least one second region in the cross-sectional profile of the ring body is different in at least two circumferential sections of the plurality of circumferential sections;
   the cross-sectional profile in at least one first circumferential section of the plurality of circumferential sections includes only the at least one first region;
   the cross-sectional profile in at least one second circumferential section of the plurality of circumferential sections includes only the at least one second region; and
   the at least one first circumferential section and the at least one second circumferential section are disposed directly adjacent to one another in the circumferential direction.

2. The sealing element according to claim 1, wherein, in the cross-sectional profile, the at least one first region and the at least one second region directly adjoin one another and are connected to one another.

3. The sealing element according to claim 1, wherein at least one of:
   the first material is one of ethylene acrylate rubber (AEM), polyacrylate rubber (ACM), methyl-vinyl silicone rubber (MVQ), acrylonitrile butadiene rubber (NBR), and ethylene propylene diene rubber (EPDM); and
   the second material is one of fluorosilicone rubber (FVMQ), fluororubber (FKM), and hydrogenated acrylonitrile butadiene rubber (HNBR).

4. The sealing element according to claim 1, wherein the ring body includes an inner contour facing towards an inner region surrounded by the ring body and an outer contour facing away from the inner region, and wherein, in at least one of the plurality of circumferential sections, the inner contour includes one of the at least one first region and the at least one second region and the outer contour includes the other of the at least one first region and the at least one second region.

5. The sealing element according to claim 4, wherein the ring body includes a plurality of sealing contours which project therefrom, and wherein a first subset of the plurality of sealing contours are structured and arranged to seal the inner region, and a second subset of the plurality of sealing contours are structured and arranged to seal an outer region facing the outer contour.

6. The sealing element according to claim 5, further comprising a boundary along which the at least one first region and the at least one second region contact one another in the cross-sectional profile of the ring body, and wherein the boundary extends between the first subset of the plurality of sealing contours and the second subset of the plurality of sealing contours such that the first subset of the plurality of sealing contours and the second subset of the plurality of sealing contours are disposed on opposite sides of the boundary.

7. The sealing element according to claim 1, wherein, in at least one of the plurality of circumferential sections, the at least one first region and the at least one second region in the cross-sectional profile of the ring body are structured mirror-symmetrically to one another and define an entirety of the cross-sectional profile of the ring body.

8. The sealing element according to claim 1, wherein:
the ring body includes a plurality of sealing contours which project therefrom in a direction of a plurality of vehicle component parts which are to be sealed;
the plurality of sealing contours includes at least one of a plurality of sealing lips, a plurality of bead-like thickenings, and a plurality of noses; and
the plurality of sealing contours define a component of the cross-sectional profile of the ring body which is constant in the circumferential direction.

9. The sealing element according to claim 1, wherein the at least one second region is defined by one of a film and a coating disposed externally on the at least one first region.

10. A sealing element of a motor vehicle, comprising a body extending in a longitudinal direction, at least one first region, and at least one second region, the at least one first region composed of a first material and the at least one second region composed of a second material having a higher chemical resistance than the first material, wherein:
a cross-sectional profile of the body perpendicular to the longitudinal direction includes at least one of the at least one first region and the at least one second region;
the body includes a plurality of longitudinal sections;
a distribution of the at least one first region and a distribution of the at least one second region in the cross-sectional profile of the body is different in at least two of the plurality of longitudinal sections;
in at least one of the plurality of longitudinal sections, the at least one first region and the at least one second region are structured mirror-symmetrically to one another in the cross-sectional profile of the body;
the body further includes a plurality of sealing contours projecting therefrom in a direction of a plurality of vehicle component parts which are to be sealed;
the cross-sectional profile in at least one first longitudinal section of the plurality of longitudinal sections includes only the at least one first region;
the cross-sectional profile in at least one second longitudinal section of the plurality of longitudinal sections includes only the at least one second region; and
the at least one first longitudinal section and the at least one second longitudinal section are disposed directly adjacent to one another in the longitudinal direction.

11. The sealing element according to claim 1, wherein:
the cross-sectional profile of the ring body is defined by a rectangular base body and a nose projecting axially from the base body; and
the nose includes a plurality of bead-like thickenings protruding radially therefrom relative to the ring body.

12. A sealing element of a motor vehicle, comprising:
a ring-shaped body having a permanently closed construction in a circumferential direction;
at least one first region of the ring-shaped body composed of a first material;
at least one second region of the ring-shaped body composed of a second material having a higher chemical resistance than the first material of the at least one first region; and
wherein:
the ring-shaped body includes a plurality of circumferential sections;
a distribution of the at least one first region and a distribution of the at least one second region in a radial cross-sectional profile of the ring-shaped body is different in at least two of the plurality of circumferential sections;
the radial cross-sectional profile in at least one first circumferential section of the plurality of circumferential sections includes only the at least one first region;
the radial cross-sectional profile in at least one second circumferential section of the plurality of circumferential sections includes only the at least one second region; and
the at least one first circumferential section and the at least one second circumferential section are disposed directly adjacent to one another in the circumferential direction.

13. The sealing element according to claim 1, wherein the cross-sectional profile in at least one section of the plurality of circumferential sections includes both the at least one first region and the at least one second region.

14. The sealing element according to claim 12, wherein the radial cross-sectional profile in at least one of the plurality of circumferential sections includes both the at least one first region and the at least one second region.

15. The sealing element according to claim 1, wherein:
the cross-sectional profile of the ring body is defined by a rectangular base body and a nose projecting therefrom;
the rectangular base body includes two opposing axially facing axial surfaces connected by two opposing radially facing radial surfaces, the two axial surfaces defining an elongated extent of the rectangular base body;
the nose projects axially from one of the two axial surfaces; and
the nose includes a plurality of bead-like thickenings protruding radially therefrom relative to the ring body.

16. The sealing element according to claim 1, wherein the at least one first region and the at least one second region are integrally connected to one another via a vulcanization connection.

17. The sealing element according to claim 1, wherein the at least one first region and the at least one second region are formed integrally with one another such that the ring body is continuous in the circumferential direction and is free of breaks and separation points.

* * * * *